United States Patent
Jakubowski, Jr. et al.

[11] Patent Number: 6,035,759
[45] Date of Patent: Mar. 14, 2000

[54] SINGLE HOOK EJECTOR RACK FOR MINIATURE MUNITIONS

[75] Inventors: Thaddeus Jakubowski, Jr., St. Charles; John K. Foster, Florissant, both of Mo.

[73] Assignee: McDonnell Douglas Corporation, St. Louis, Mo.

[21] Appl. No.: 09/073,892

[22] Filed: May 7, 1998

[51] Int. Cl.⁷ .................................................. B64D 1/04
[52] U.S. Cl. ..................... 89/1.54; 89/1.51; 244/137.4
[58] Field of Search .................... 89/1.54, 1.53, 89/1.51; 244/137.4, 118.1

[56] References Cited

U.S. PATENT DOCUMENTS

| | | | |
|---|---|---|---|
| 2,451,481 | 10/1948 | Elder et al. | 244/118.1 |
| 3,181,908 | 5/1965 | Clark | 244/137.4 |
| 3,677,506 | 7/1972 | La Roe | 244/137.4 |
| 3,854,680 | 12/1974 | Hasquenoph et al. | 277/118.1 |
| 3,854,681 | 12/1974 | Hasquenoph et al. | 89/1.54 |
| 3,982,466 | 9/1976 | Baker | 89/1.54 |
| 4,056,248 | 11/1977 | Hasquenoph et al. | 244/137.4 |
| 4,132,377 | 1/1979 | Schorr | 244/137.4 |
| 4,346,642 | 8/1982 | Uhle | 89/1.51 |
| 4,399,733 | 8/1983 | Mick | 89/1.51 |
| 4,407,180 | 10/1983 | Regnat | 89/1.51 |
| 4,850,553 | 7/1989 | Takata et al. | 244/137.4 |
| 5,052,639 | 10/1991 | Lemacon | 244/137.4 |

*Primary Examiner*—Charles T. Jordan
*Assistant Examiner*—Jeff Howell
*Attorney, Agent, or Firm*—Alston & Bird LLP

[57] ABSTRACT

The stores ejection system of the present invention includes a single release hook and swaybraced ejection rams for releasably mounting and forcibly ejecting miniature munitions and other miniature stores on an aircraft. The pneumatically-driven stores ejection system can accommodate miniature stores having bail lugs sized to reduce store aerodynamic drag and radar signature and to improve store delivery accuracy.

8 Claims, 3 Drawing Sheets

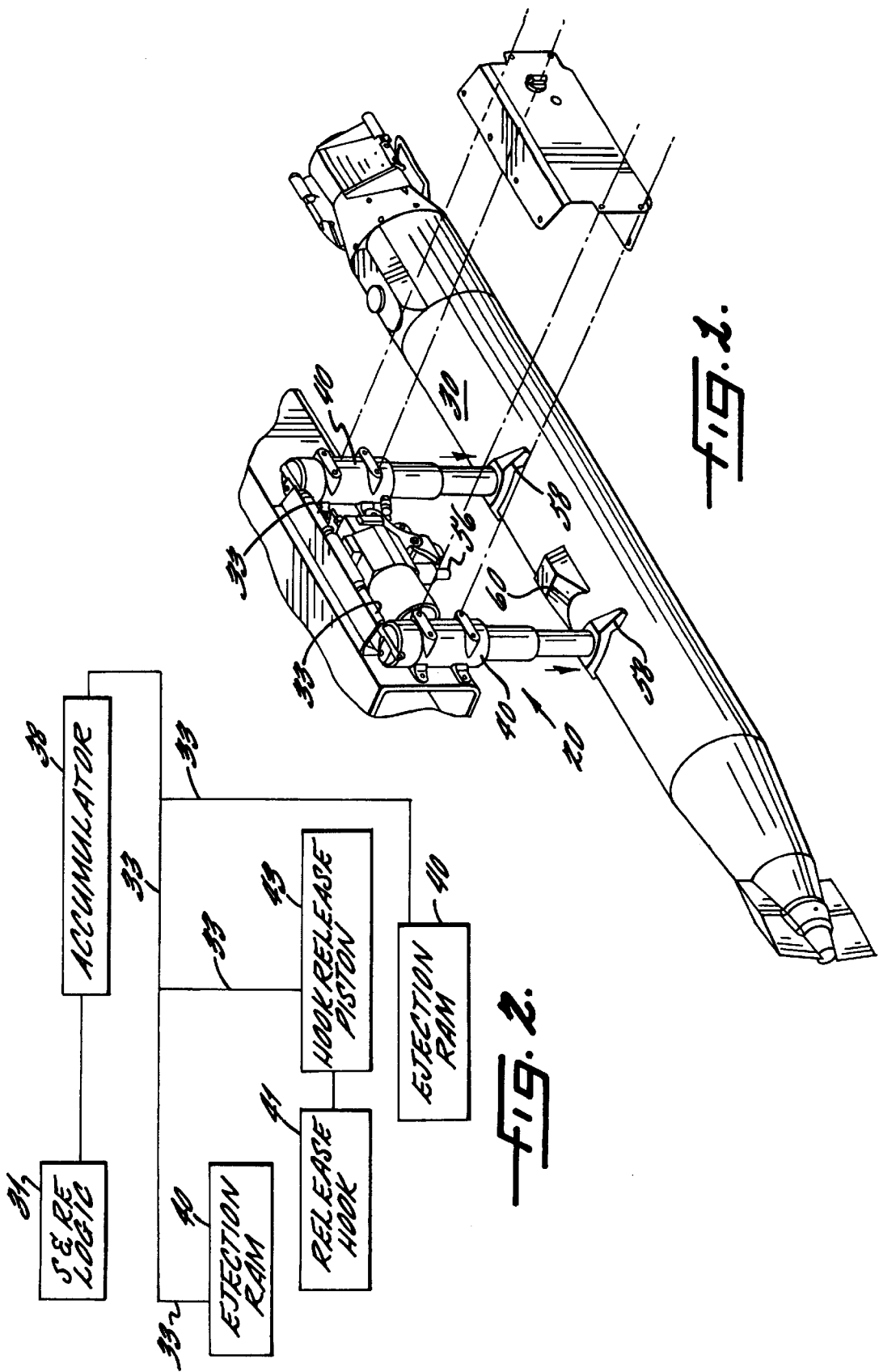

SINGLE HOOK EJECTOR RACK FOR MINIATURE MUNITIONS

FIELD OF THE INVENTION

This invention relates generally to store ejector racks for releasably mounting a bomb or other store on an aircraft and, more particularly, to a store ejector rack that ejects a small diameter store from an aircraft by opening a single release hook and forcing an ejection ram against the store upon command.

BACKGROUND OF THE INVENTION

Military strike aircraft are designed to carry and release a wide range of weapons and other "stores" (bombs, for example) while in flight. Aircraft used to deliver stores in flight typically incorporate release and ejection equipment (ejector racks) located beneath the wings and fuselage that are designed to release the stores upon command during flight. Typical ejector racks are disclosed in U.S. Pat. Nos. 4,043,525 and 4,347,777, both of which are assigned to an affiliate of the entity to which the present invention is assigned.

A typical stores ejection system mechanically releases and forcibly ejects the store away from the aircraft slipstream upon command. Conventionally, pneumatic ejector piston rams housed within the ejection rack are forced outward against the store in response to the sudden release of pressurized fluid. Store release hooks that engage store structural attachment members known as "bail lugs" are opened simultaneously, and the store is forcibly ejected away from the aircraft body.

A modern ejector rack system is disclosed in U.S. Pat. No. 5,583,312 to Jakubowski, in which a pneumatic ejector rack having a single on-board pressurization system for initiating multiple release mechanisms is disclosed. The Jakubowski system uses filtered pressurized air as an energy storage fluid. Since the compressor system is on-board, a constant pressure may be maintained independent of outside temperature and pressure changes. In operation, the pressurized gas from the accumulator, when released through a feed port, opens store release hooks and simultaneously forces ejector pistons outward, thereby forcibly releasing and jettisoning the store.

Conventional stores ejection systems are designed to accommodate conventional stores. The United States military has published military standard MIL-STD-2088A, which provides specifications for ejector rack systems to eject conventional stores with diameters between 8.0 and 30.0 inches at up to 22,500 pounds of ejection force. MIL-STD-2088A is incorporated herein by reference. Based on store weight and diameter, MIL-STD 2088A specifies the interface between the ejector rack and two classes of store. For stores weighing up to 1,450 pounds and with diameters between 8.0 and 20.0 inches, the ejector rack must engage the store with two appropriately-sized bail lugs spaced 14.0 inches apart along the length of the store. For stores weighing up to 5,000 pounds and with diameters between 8.0 and 30.0 inches, the ejector rack must engage the store with two larger bail lugs spaced 30.0 inches apart along the length of the store. Conventional stores ejection systems thus comprise two store release hooks spaced apart by either 14.0 inches or 30.0 inches and sized to engage bail lugs for stores in either of two weight classes.

Defense industries around the world are developing new "miniature munitions" that are considerably smaller and lighter than conventional stores, with diameters less than 8.0 inches and weights under 500 pounds. Conventional stores ejection systems are not well-suited to accommodate these new miniature stores for several reasons. First, ejector racks designed to comply with MIL-STD-2088A include two store release hooks separated by either 14.0 inches or 30.0 inches. The conventional configuration of two widely-spaced hooks is too large to accommodate miniature stores, some of which are less than 30 inches in length. Moreover, conventional ejector racks include integral swaybraces sized to provide swaybracing to conventional stores, which have diameters greater than 8.0 inches. The swaybraces on conventional ejector racks cannot provide adequate swaybracing to miniature stores.

Two-hook ejector racks allow independent loading of each of the two store bail lugs into each of the two hooks. The two hooks must be opened simultaneously, however, to properly release the store. The requirement that the hooks be loaded independently but opened dependently dictates the use of a complex mechanical linkage between the hooks in a conventional two-hook stores ejection system.

Moreover, bail lugs designed to be engaged by conventional ejector racks are large relative to the size of the miniature store (protruding approximately 1.55 inches above a store that is less than 8.0 inches in diameter). A relatively large bail lug degrades store aerodynamic performance, and hence store delivery accuracy, and results in higher radar cross section for the store. Miniature stores can use alternative hook engagement devices that are smaller and more aerodynamic than standard bail lugs, however conventional ejector racks are not compatible with these alternative devices.

Conventional two-hook stores ejection systems, therefore, suffer from the limitations discussed above. In particular, conventional stores ejection systems cannot provide adequate swaybracing to miniature stores with diameters less than 8.0 inches. Conventional stores ejection systems are also not suitable for use with smaller stores because the relative size of the store bail lugs required to mate with conventional ejector racks results in increased store aerodynamic drag and radar signature and reduced store delivery accuracy. In addition, conventional stores ejection mechanisms with two release hooks include a complex hook release mechanical linkage.

SUMMARY OF THE INVENTION

It is an object of the present invention to provide a stores ejection system, for releasably mounting and forcibly ejecting a miniature store on an aircraft, that includes not more than one hook or other store release device.

This and other objects are provided, according to the present invention, by a stores ejection system comprising means for releasably engaging the store at not more than one point, the one point located at the center of gravity of the store. Preferably, the releasable engaging means includes not more than one release device for releasably engaging the store. The stores ejection system also includes means, such as at least one ejection ram, connected to the releasable engaging means for forcibly ejecting the store following disengagement of the releasable engaging means. In this regard, the stores ejection system can include means for actuating the forcible ejection means and the releasable engaging means. The stores ejection system may be adapted to pyrotechnic or non-pyrotechnic ejection systems.

In one embodiment of the present invention, a pneumatically operated stores ejection system is provided that includes a pressurized air accumulator and not more than one store release device. The stores ejection system of this embodiment can also include an overcenter mechanism to bias the store release device open before a store is loaded and closed after a store is loaded, as well as a hook release piston to force the store release device open upon the release of pressurized air from the accumulator. The stores ejection system of this embodiment can also include two ejection rams to forcibly eject the store upon the release of additional pressurized air from the accumulator. The two ejection rams are spaced apart lengthwise along the store on opposite sides of the release device. The ejection rams preferably include a store contact adjuster for securing ejection ram swaybraces into contact with the store in preparation for flight.

In operation, a miniature store is loaded into the aircraft stores ejection system by ground personnel. The single release device releasably engages the store, and store contact adjusters in each of the two ejector rams are adjusted to move the ejection ram swaybraces into contact with the store. Prior to store ejection, a remote air compressor delivers compressed air for storage to the accumulator. Upon command, the ejection ram is actuated by the release of pressurized air from the accumulator to the ejection rams. The overcenter mechanism opens the release device, releasing the store, as the compressed air extends the ejector rams. The store is forcibly ejected as the ejector rams are fully extended.

The stores ejection system of the present invention overcomes limitations imposed by conventional stores ejection systems. In particular, a stores ejection system is provided that can accommodate miniature stores, which are typically less than 8.0 inches in diameter, having bail lugs sized to reduce store aerodynamic drag and radar signature and to improve store delivery accuracy.

BRIEF DESCRIPTION OF THE DRAWINGS

FIG. 1 is a perspective view of an aircraft with an ejector rack and a store mounted underneath an aircraft wing.

FIG. 2 is a schematic block diagram representation of a pneumatically-driven single-hook stores ejection system according to one embodiment of the present invention.

DETAILED DESCRIPTION OF THE INVENTION

Figure 3:
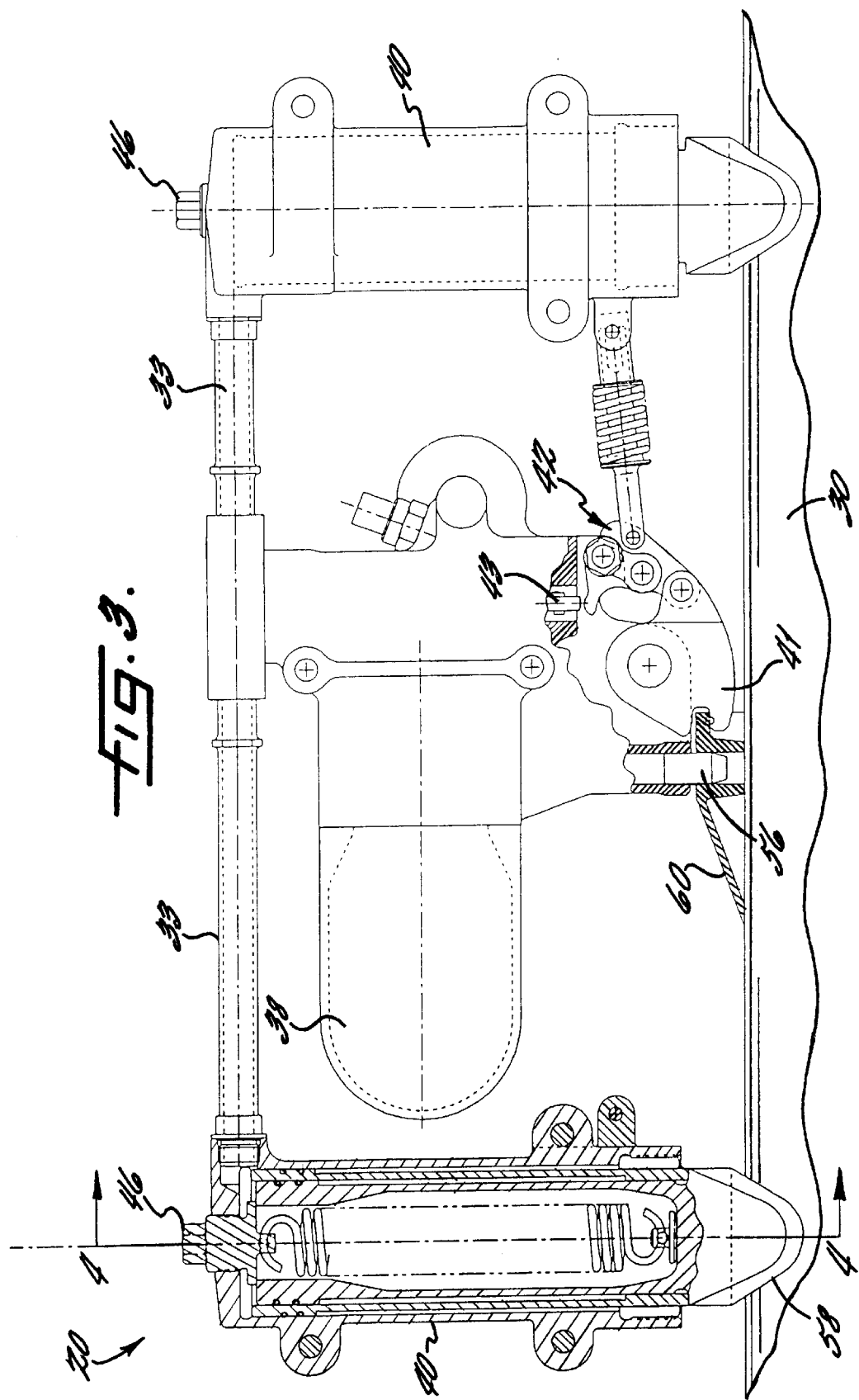
FIG. 3 is a side view depicting a stores ejection system comprising two pneumatically-driven ejector rams and a single release hook for retaining and forcibly ejecting a miniature store according to one embodiment of the present invention.

The present invention will now be described more fully with reference to the accompanying drawings, in which preferred embodiments of the invention are shown. This invention may, however, be embodied in many different forms and should not be construed as limited to the embodiments set art. Like numbers refer to like elements throughout.

Referring now to FIG. 1, an ejection system 20 is shown for mounting under a wing of an aircraft. While the aircraft is on the ground, miniature store 30 is loaded into ejection system 20 by ground personnel. Miniature store 30 is retained by means for releasably engaging the store at not more than one point, such as release hook 41, during flight, the one point preferably located at the center of gravity of the store. Upon command, miniature store 30 is released by the releasable engaging means and is forcibly ejected by means for forcibly ejecting the store, such as ejection rams 40. When the aircraft returns to the ground, a new miniature store 30 may be loaded into ejection system 20.

Ejection system 20 is preferably pneumatically operated with air as the pressurized fluid, although other fluids can be utilized. As such, the ejection system 20 preferably includes a source of pressurized fluid and fluid control means. Referring now to FIG. 2, in one embodiment of the invention, pressurized air is stored in accumulator means, such as accumulator 38. As shown in FIG. 2, the stores ejection system 20 includes means, such as S&RE logic 31, for actuating the forcible ejection means, such as by controlling release of the fluid from accumulator 38. S&RE logic 31 preferably operates in response to a firing signal, indicating that the store is to be released, that may be supplied by the pilot or co-pilot of the aircraft. S&RE logic 31 preferably comprises one or more controllers or related memory elements operating under software control.

As shown in FIG. 3, the stores ejection system 20 can include an overcenter mechanism 42 to bias the store release device open before a store is loaded and closed after a store is loaded. The stores ejection system 20 can also include a hook release piston 43 to open the store release device upon the release of pressurized air from the accumulator. In response to an actuating signal from the S&RE logic 31, the ejection system provides pressurized fluid from accumulator 38 to ejection rams 40 and hook release piston 43 via manifold conduit 33. In response to the pressurized fluid, hook release piston 43 opens release hook 41 to release miniature store 30. Miniature store 30 is then forcibly ejected away from the aircraft as ejection rams 40 are also forcibly extended in response to the force of the pressurized fluid.

Referring now to FIG. 3, ejection system 20 is adapted to release and forcibly eject miniature stores 30 that are less than 8.0 inches in diameter and that weigh less than 500 pounds. Ejection system 20 comprises means for is releasably engaging miniature store 30 at not more than one point, such as not more than one release hook 41. Preferably, release hook 41 releasably engages miniature store 30 at faired hanger 60, which is preferably a low-profile structure sized for miniature store 30 and adapted to reduce the aerodynamic drag and radar cross section of miniature store 30.

The stores ejection system 20 of this embodiment also includes ejection rams 40 located at equal distances on either side of release hook 41 along the length of miniature store 30. Ejection rams 40 preferably include integral swaybracing means, such as swaybraces 58, to stabilize miniature store 30. Upon command from S&RE logic 31, pressurized fluid is released from accumulator 38 via manifold conduit 33 to each of ejection rams 40 and to hook release piston 43.

Preferably, overcenter mechanism 42 includes means for biasing release hook 41 to a closed position during the time between store loading and store ejection, and for otherwise biasing release hook 41 to an open position. Such bias means may be a spring-loaded device that is biased to maintain closure of release hook 41 after release hook 41 has been closed and to maintain release hook 41 open after release hook 41 has been opened. Alternatively, overcenter mechanism 42 may be any of several other types of two-position overcenter devices well known to those skilled in the art.

As hook release piston 43 opens release hook 41 to release miniature store 30, ejection rams 40 are forcibly extended in response to the rapid release of pressurized fluid from accumulator 38. Miniature store 30 is thereby forcibly ejected away from the aircraft.

Figure 4:
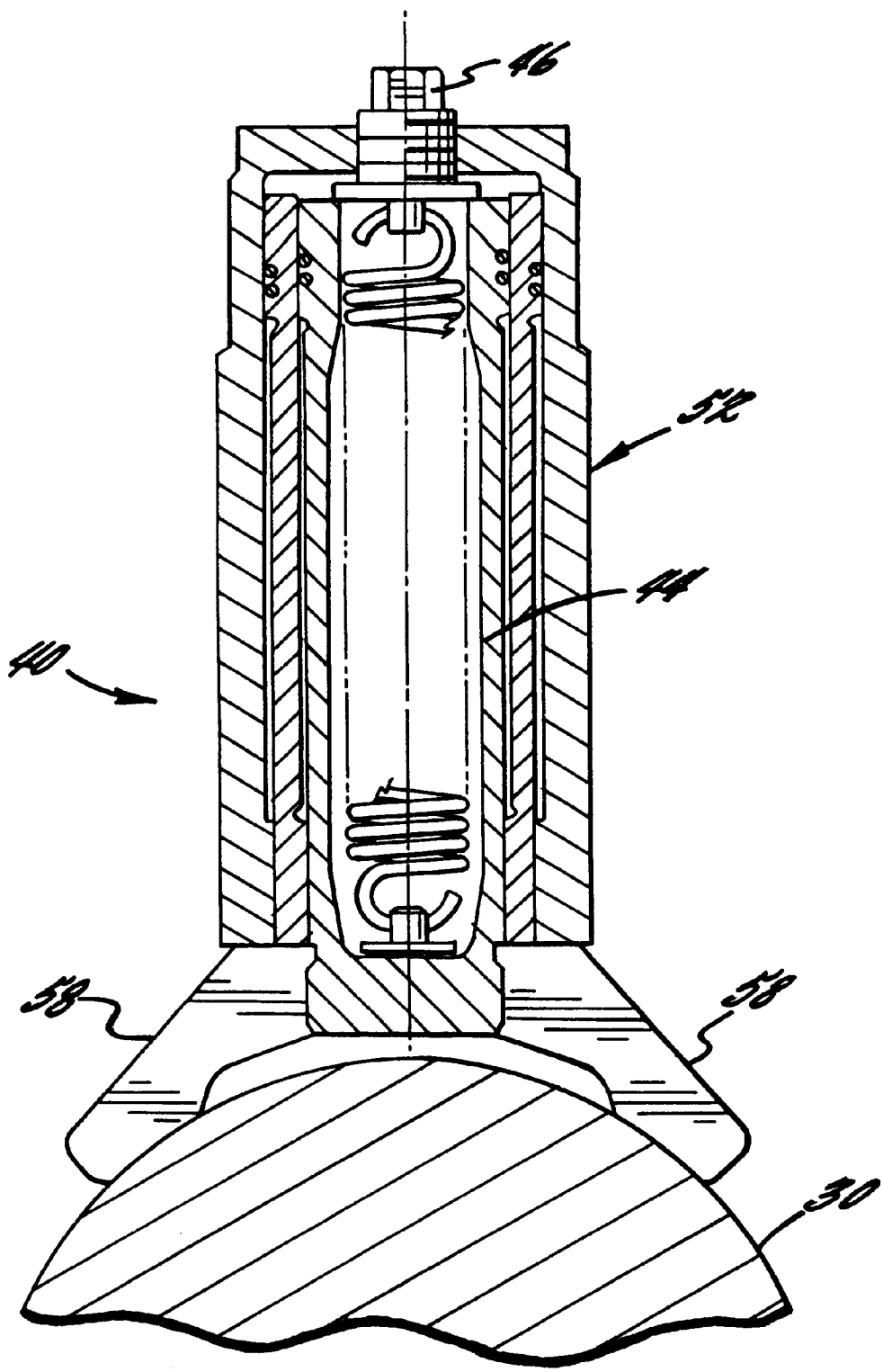
FIG. 4 is an end view depicting an ejector ram with a store contact adjuster and swaybracing integral to the ejector ram.

Referring now to FIG. 4, each of ejector rams 40 preferably includes swaybracing means, such as swaybrace 58, for stabilizing miniature store 30 during flight. Preferably, swaybrace 58 is integral to ejection ram 40.

In one embodiment of the invention, ejector ram 40 includes adjustment means, such as store contact adjuster 46, for moving ejection ram 40 into contact with miniature store 30 before ejection to stabilize store 30 during flight. As shown in FIG. 4, store contact adjuster 46 may be a screw or threaded rod threaded into threads in the top of ejector housing 52. Store contact adjuster 46 is adjusted, such as by turning a screw, to extend ejector piston 44, which is slideably retained within ejector housing 52, into contact with miniature store 30 through swaybrace 58. In operation, store contact adjuster 46 is adjusted to extend ejection ram 40 into contact with miniature store 30 by ground personnel after store loading.

The stores ejection system 20 of the present invention therefore overcomes limitations imposed by conventional stores ejection systems. In summary, a stores ejection system is provided that can accommodate miniature stores 30 of diameter less than 8.0 inches and weight less than 500 pounds. The system can accommodate miniature stores having bail lugs sized to reduce store aerodynamic drag and radar signature and to improve store delivery accuracy.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A stores ejection system for releasably mounting and forcibly ejecting a store on an aircraft, the stores ejection system comprising:

not more than one release device for releasably engaging the store;

at least one ejection ram, operatively connected to the release device, for forcibly ejecting the store upon disengagement of the release device;

an accumulator for receiving and storing pressurized fluid, the accumulator being in fluid communication with the ejection ram such that the ejection ram forcibly ejects the store upon release of the pressurized fluid from the accumulator to the ejection ram;

a hook release piston, in fluid communication with the accumulator, for opening the release device upon release of the pressurized fluid from the accumulator to the hook release piston; and means for biasing the release device to a closed position between store loading and store ejection, and for otherwise biasing the release device to an open position;

wherein the release device is adapted to mate with a faired hanger mounted upon the store;

wherein the at least one ejection ram comprises at least two ejection rams spaced apart in a lengthwise direction along the store on opposite sides of the release device; and wherein the ejection rams include a store contact adjuster for moving the ejection rams into contact with the store for stabilizing the store during flight.

2. A stores ejection system for releasably mounting and forcibly ejecting a store on an aircraft, the stores ejection system comprising:

a hook and a drag post for releasably engaging the store at not more than one point, the one point located at the center of gravity of the store, wherein the hook and the drag post are adapted to mate with a faired hanger mounted upon the store;

means for forcibly ejecting the store, wherein the forcible ejection means is operatively connected to the hook; and means for actuating the forcible ejection means and the hook to thereby release and eject the store.

3. The stores ejection system of claim 2 further comprising:

accumulator means for receiving and storing pressurized fluid;

wherein the forcible ejection means comprises an ejection ram in fluid communication with the accumulator means such that the ejection ram forcibly ejects the store upon release of the pressurized fluid from the accumulator means to the ejection ram.

4. The stores ejection system of claim 2 further comprising an overcenter mechanism to bias the hook to either a closed position or an open position.

5. The stores ejection system of claim 2 wherein the forcible ejection means comprises adjustment means for moving the ejection ram into contact with the store after store loading for stabilizing the store during flight.

6. The stores ejection system of claim 2 wherein the releasable engaging means comprises at least one release device and further comprises means for biasing the release device to a closed position between store loading and store ejection, and for otherwise biasing the release device to an open position.

7. The stores ejection system of claims 2 wherein the forcible ejection means comprises sway bracing means for stabilizing the store during flight.

8. A stores ejection system for releasably mounting and forcibly ejecting a store on an aircraft, the stores ejection system comprising:

means for releasably engaging the store at not more than one point, the one point located at the center of gravity of the store;

means for forcibly ejecting the store, wherein the forcible ejection means is operatively connected to the releasable engaging means;

means for actuating the forcible ejection means and the releasable engaging means to thereby release and eject the store; and accumulator means for receiving and storing pressurized fluid;

wherein the forcible ejection means comprises an ejection ram in fluid communication with the accumulator means such that the ejection ram forcibly ejects the store upon release of the pressurized fluid from the accumulator means to the ejection ram; and wherein the forcible ejection means further comprises at least two ejection rams spaced apart in a lengthwise direction along the store on opposite sides of a faired hanger, the ejection rams adapted to forcibly eject the store upon release of the pressurized fluid from the accumulator means to the ejection rams.

* * * * *

UNITED STATES PATENT AND TRADEMARK OFFICE
CERTIFICATE OF CORRECTION

PATENT NO. : 6,035,759

DATED : March 14, 2000

INVENTOR(S) : Jakubowski, Jr. et al.

It is certified that error appears in the above-identified patent and that said Letters Patent is hereby corrected as shown below:

Title page, [56] References Cited, U.S. PATENT DOCUMENTS, insert the following:

--4,043,525  8/1977   Jakubowski, Jr.

4,347,777  9/1982   Jakubowski, Jr. et al.

5,487,322  1/1996   Rhodes 5,583,312  12/1996  Jakubowski, Jr.--.

Signed and Sealed this

Twenty-seventh Day of February, 2001

Attest:

NICHOLAS P. GODICI

*Attesting Officer*    *Acting Director of the United States Patent and Trademark Office*